US008863574B2

(12) United States Patent
Kho et al.

(10) Patent No.: US 8,863,574 B2
(45) Date of Patent: *Oct. 21, 2014

(54) YAW RATE SENSOR, SENSOR SYSTEM, METHOD FOR OPERATING A YAW RATE SENSOR AND METHOD FOR OPERATING A SENSOR SYSTEM

(75) Inventors: Rex Kho, Holzkirchen (DE); Oliver Kohn, Reutlingen (DE); Fouad Bennini, Reutlingen (DE); Julian Bartholomeyczik, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 266 days.

This patent is subject to a terminal disclaimer.

(21) Appl. No.: 13/114,660

(22) Filed: May 24, 2011

(65) Prior Publication Data

US 2011/0314912 A1 Dec. 29, 2011

(30) Foreign Application Priority Data

Jun. 1, 2010 (DE) .................... 10 2010 029 590

(51) Int. Cl.
*G01C 19/56* (2012.01)
*G01C 19/5755* (2012.01)
*G01C 19/5726* (2012.01)

(52) U.S. Cl.
CPC ........ *G01C 19/5755* (2013.01); *G01C 19/5726* (2013.01)
USPC ........................................ 73/504.12; 73/1.37

(58) Field of Classification Search
USPC ............... 73/504.12, 504.14, 504.02, 504.04, 73/510, 511, 1.37, 1.77
See application file for complete search history.

(56) References Cited

U.S. PATENT DOCUMENTS

| | | | |
|---|---|---|---|
| 6,276,204 B1 * | 8/2001 | Townsend | 73/504.12 |
| 6,298,709 B1 * | 10/2001 | Artzner et al. | 73/1.38 |
| 6,453,743 B1 * | 9/2002 | Royle et al. | 73/504.12 |
| 6,853,315 B2 * | 2/2005 | Schiller et al. | 340/974 |
| 2006/0106582 A1 * | 5/2006 | Schmidt | 702/189 |
| 2008/0178672 A1 * | 7/2008 | Kanai et al. | 73/504.12 |
| 2008/0234935 A1 | 9/2008 | Wolf et al. | |
| 2009/0007661 A1 | 1/2009 | Nasiri et al. | |
| 2009/0016555 A1 | 1/2009 | Lynnworth | |
| 2009/0064781 A1 * | 3/2009 | Ayazi et al. | 73/504.12 |
| 2009/0071247 A1 * | 3/2009 | Konaka | 73/504.14 |
| 2009/0084180 A1 * | 4/2009 | Yoshida et al. | 73/504.02 |
| 2009/0165555 A1 * | 7/2009 | Uemura | 73/504.12 |
| 2009/0293615 A1 * | 12/2009 | Lee | 73/514.01 |
| 2010/0071467 A1 * | 3/2010 | Nasiri et al. | 73/504.12 |
| 2011/0146403 A1 * | 6/2011 | Rizzo Piazza Roncoroni et al. | 73/504.12 |
| 2011/0283126 A1 * | 11/2011 | Bartholomeyczik et al. | 713/323 |
| 2011/0290020 A1 * | 12/2011 | Kohn | 73/504.12 |
| 2013/0312520 A1 * | 11/2013 | Kho | 73/504.12 |

FOREIGN PATENT DOCUMENTS

DE 195 19 488 11/1996

* cited by examiner

*Primary Examiner* — Helen Kwok
(74) *Attorney, Agent, or Firm* — Kenyon & Kenyon LLP

(57) ABSTRACT

A yaw rate sensor having a substrate and a seismic mass is described, in which the seismic mass is excitable to a working oscillation relative to the substrate via a drive unit, and a Coriolis deflection of the seismic mass is detectable relative to the substrate, in which the yaw rate sensor furthermore has an interrupt interface, the drive unit being configured to reduce a frequency and/or an amplitude of the working oscillation if an interrupt signal is present at the interrupt interface.

9 Claims, 2 Drawing Sheets

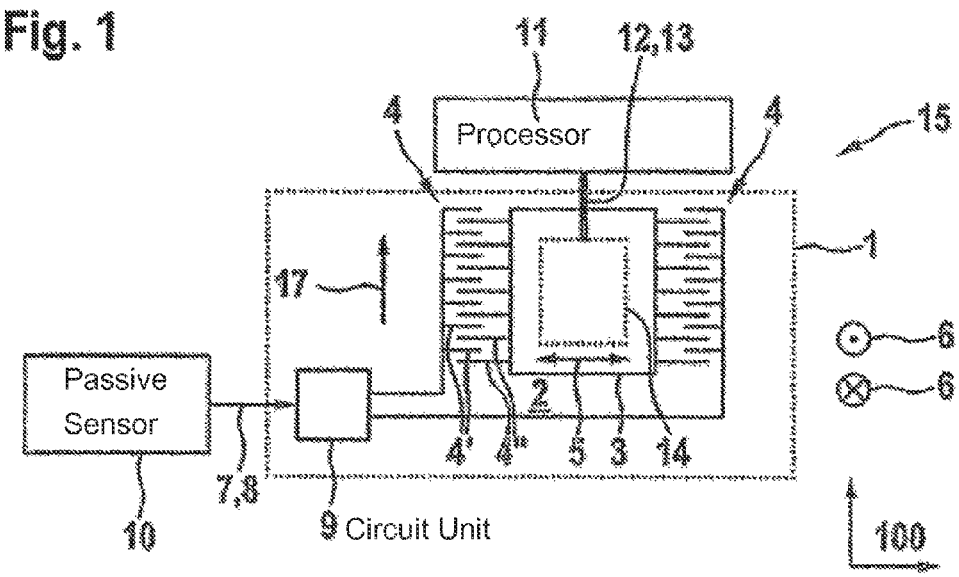

YAW RATE SENSOR, SENSOR SYSTEM, METHOD FOR OPERATING A YAW RATE SENSOR AND METHOD FOR OPERATING A SENSOR SYSTEM

RELATED APPLICATION INFORMATION

The present application claims priority to and the benefit of German patent application no. 10 2010 029 590.6, which was filed in Germany on Jun. 1, 2010, the disclosure of which is incorporated herein by reference.

FIELD OF THE INVENTION

The present invention is directed to a yaw rate sensor.

BACKGROUND INFORMATION

There are believed to be yaw rate sensors of this type. For example, a yaw rate sensor having a first and a second oscillating mass is discussed in German patent publication DE 195 19 488 A1, in which the first and the second oscillating masses each being excited to a working oscillation with the aid of an excitation arrangement, a first Coriolis deflection of the first oscillating mass and a second Coriolis deflection of the second oscillating mass each being detected with the aid of evaluation means and differentially evaluated in a suitable manner for the purpose of determining a yaw rate. The sensor is a so-called active sensor, since the first and second oscillating masses must be continuously excited to working oscillation for the purpose of measuring the Coriolis deflections. The yaw rate sensor therefore consumes power even if no yaw rate to be measured is present.

SUMMARY OF THE INVENTION

The yaw rate sensor according to the present invention, the sensor system according to the present invention, the method according to the present invention for operating a yaw rate sensor, and the method according to the present invention for operating a sensor system, according to the description herein, are believed to have the advantage over the related art that the power consumption of the yaw rate sensor is reduced when an interrupt signal is present at the yaw rate sensor. The interrupt signal is advantageously applied directly to the yaw rate sensor itself via the interrupt interface, which directly produces a reduction in the frequency and/or amplitude of the working oscillation for reducing the power consumption of the yaw rate sensor, without requiring additional external control units such as microcontrollers or processors for activating a power-saving mode of the yaw rate sensor.

On the one hand, this conserves power consumption on the part of external control units of this type, and on the other had, the reduction in power consumption at the yaw rate sensor is initiated much faster (in particular, without being routed through the external control units). It is furthermore possible for the external control units to be placed in a power-saving mode at a point in time before the yaw rate sensor, which further reduces overall power consumption.

Advantageously, it is possible to integrate an interrupt interface into the yaw rate sensor comparatively easily, cost-efficiently, and using minimal installation space. Reducing the frequency and/or amplitude of the working oscillation in the sense of the present invention means, in particular, that the yaw rate sensor is switched from an operating mode to a power-saving mode, in particular a "sleep mode," in which the working oscillation is completely deactivated (frequency and amplitude are largely equal to zero), or to a "low power mode," in which a working oscillation operates under reduced power consumption (frequency and/or amplitude is/are reduced compared to a normal operating mode). The interrupt signal may be generated by an external component which includes, in particular, a passive sensor, so that the power consumption induced by the external component is less than the power consumption induced by the yaw rate sensor in the operating mode. The passive sensor includes, for example, an acceleration sensor which generates the interrupt signal at the interrupt interface if no acceleration forces are measurable and/or if the measured acceleration forces do not exceed a determined threshold value.

In this manner, it may be ensured that no yaw rate which is measurable by the yaw rate sensor is present and, for this reason, switching the yaw rate sensor to power-saving mode is justified without yaw rates to be measured being "overlooked." The yaw rate sensor may include a micromechanical yaw rate sensor, the substrate including a semiconductor substrate, in particular silicon. The interrupt interface may include a connecting pin of the yaw rate sensor, which acts as an electric contact and, in particular, as a simple plug contact.

Advantageous embodiments and refinements of the present invention are described in the description herein, with reference to the drawings.

According to a specific embodiment, it is provided that the yaw rate sensor has a circuit unit which is functionally coupled with the interrupt interface and with the drive unit, the circuit unit being configured to detect the interrupt signal, and the circuit unit being configured to control the drive unit as a function of the interrupt signal in such a way that a reduction in the frequency and/or amplitude of the working oscillation is provided upon detection of the interrupt signal. The drive unit is advantageously controlled by the circuit unit in such a way that the power consumption of the yaw rate sensor is immediately reduced upon detection of the interrupt signal. The circuit unit may be implemented, in particular, with the aid of a simple and particularly energy-efficient electric and/or electronic circuit, it being conceivable, however, to alternatively use an ASIC (Application Specified Integrated Circuit) and/or a microcontroller as the circuit unit.

The drive unit may include a capacitive drive, for example, in the form of a finger electrode and/or capacitor plate drive, so that the seismic mass is driven to working oscillation by the drive unit with the aid of electrostatic interaction. The electrostatic interaction may be induced by an alternating voltage between electrodes of the drive unit and counter-electrodes of the seismic mass. The circuit unit may be configured, in particular, to reduce the frequency and/or amplitude of the alternating voltage and/or to deactivate the alternating current once an interrupt signal has been detected at the interrupt interface.

According to a specific embodiment, it is provided that the yaw rate sensor is configured to activate the working oscillation and/or to increase the frequency and/or amplitude to an initial value if an interrupt signal is not present at the interrupt interface. When the interrupt signal is no longer present at the interrupt interface, the yaw rate sensor is advantageously "woken up" from the power-saving mode and returned to its operating mode, in which yaw rates are accurately detected by the yaw rate sensor. This wake-up operation takes place, for example, when the external component, and in particular the acceleration sensor, detects an appropriate acceleration signal which makes the presence of a yaw rate to be measured sufficiently probable for switching the yaw rate sensor to operating mode.

According to a specific embodiment, it is provided that the yaw rate sensor has a data interface, the yaw rate sensor being connected to a working processor via the data interface, the yaw rate sensor, which is dependent on the Coriolis deflection, and may be configured to output an output signal to the working processor via the data interface, and the data interface, in particular, and may be independent of the interrupt interface. In the operating mode of the yaw rate sensor, the output signal measured by the yaw rate sensor, which is, in particular, proportional to a present yaw rate, is advantageously transmitted to the working processor.

The interrupt interface and the data interface may be independent of each other or separated from each other in such a way that the interrupt signal must not inevitably be transmitted from the external component to the yaw rate sensor via the working processor, but is instead applied directly to the yaw rate sensor. The data interface may be a digital data interface. Designing the interrupt interface independently of the data interface has the advantage that additional information does not have to be transmitted via the data interface, and thus the bandwidth of the data interface is not limited. The working processor may include a microcontroller which is provided for using or further processing the yaw rate information.

A further subject matter of the present invention is a sensor system having a yaw rate sensor according to the present invention and a sensor, wherein the yaw rate sensor is connected to the sensor via the interrupt sensor, the sensor being configured to output the interrupt signal via the interrupt interface as a function of a sensor signal. The sensor thus acts as the aforementioned external component. The sensor signal is advantageously used as an indicator of the presence or absence of a yaw rate. As a function of the sensor signal, for example, the absence of a yaw rate is thus detected, in particular over a determined time interval, and the interrupt signal is subsequently generated, which is used to switch the yaw rate sensor from the operating mode to the power-saving mode. Conversely, upon detection of a yaw rate, the yaw rate sensor is switched from power-saving mode back to operating mode by deactivating the interrupt signal. In particular, the sensor may include a passive sensor which has a lower power consumption than the yaw rate sensor in the operating mode, so that the overall power consumption of the sensor system is comparatively low during power-saving mode of the yaw rate sensor.

According to a specific embodiment, it is provided that the sensor is configured to output the interrupt signal via the interrupt interface as a function of a comparison between the sensor signal and a sensor threshold value, and/or it is provided that the sensor includes an acceleration sensor and/or a proximity sensor. The sensor advantageously includes an acceleration sensor, the sensor signal including an acceleration value measured by the acceleration sensor, which is used as an indicator of the presence or absence of a yaw rate, so that the interrupt signal is generated at the interrupt interface if no acceleration forces are measurable and/or if the measured acceleration forces do not exceed a determined threshold value. The interrupt interface is coupled, in particular, with an "ANY MOTION" output of the acceleration sensor.

A further subject matter of the present invention is a method for operating a yaw rate sensor, a seismic mass being excited to a working oscillation by a drive unit, and a Coriolis deflection of the seismic mass perpendicular to the working oscillation being detected, a frequency and/or an amplitude of the working oscillation being reduced if an interrupt signal is detected at an interrupt interface of the yaw rate sensor. As discussed in detail above, the yaw rate sensor is thus advantageously switched from operating mode to power-saving mode once the interrupt signal is present at the interrupt interface. The power consumption of the yaw rate sensor may be easily reduced in this manner, compared to the related art, without additional, power-intensive, external control units such as microcontrollers or processors being required to activate the power-saving mode of the yaw rate sensor.

According to a specific embodiment, it is provided that the interrupt interface is monitored for the presence of the interrupt signal via a circuit unit, and the drive unit is controlled via the circuit unit in such a way that the frequency and/or amplitude of the working oscillation is reduced upon detection of the interrupt signal, the frequency and/or amplitude of the working oscillation may be reduced to the extent that the working oscillation is stopped. In an advantageous manner, the interrupt interface is thus continuously monitored by the circuit unit in such a way that the power-saving mode is activated in the form of the "sleep mode," in which the working oscillation is completely disabled (frequency and amplitude are largely equal to zero), or in the form of the "low power mode," in which a working oscillation operates at reduced power consumption (frequency and/or amplitude is/are reduced compared to a normal operating mode).

According to a specific embodiment, it is provided that the working oscillation is reactivated and/or the frequency and/or amplitude of the working oscillation is/are again increased to an initial value once the interrupt signal is no longer detected. The yaw rate sensor is advantageously switched back from power-saving mode to operating mode, in particular using the circuit unit, once the interrupt signal is no longer present or is interrupted (for example, by the sensor or the external component).

According to a specific embodiment, it is provided that, if no interrupt signal is detected, an output signal may be generated as a function of the Coriolis deflection, the output signal being transmitted to a working processor via a data interface which, in particular, is independent of the interrupt interface.

A further subject matter of the present invention is a method for operating a sensor system having a yaw rate sensor and a sensor, wherein the yaw rate sensor is operated using the method according to the present invention for operating a yaw rate sensor, the interrupt signal being generated by the sensor, the interrupt signal may be generated as a function of a comparison between a sensor signal and a sensor threshold value, and the interrupt signal may be generated, in particular, if a determined acceleration value is measured by the sensor, in particular by an acceleration sensor. In particular, an acceleration value measured by the acceleration sensor is advantageously generated which is used as an indicator of the presence or absence of a yaw rate, so that the interrupt signal is generated at the interrupt interface if no appreciable acceleration forces are measurable and/or if the measured acceleration forces do not exceed a determined threshold value.

Exemplary embodiments of the present invention are illustrated in the drawings and explained in greater detail in the following description.

BRIEF DESCRIPTION OF THE DRAWINGS

FIG. 1 shows a schematic view of a sensor system according to a first specific embodiment of the present invention.

DETAILED DESCRIPTION

Figure 2A:
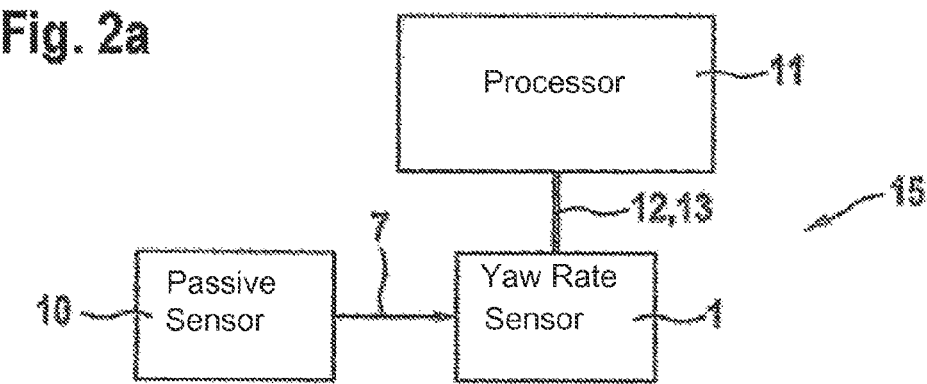
FIG. 2a shows a schematic view of an operating state of a sensor system according to a second specific embodiment of the present invention.

In the different figures, the same components are always provided with the same reference numerals and are therefore, as a rule, also named or mentioned only once in each case.

FIG. 1 shows a schematic view of a sensor system 15 according to a first specific embodiment of the present invention. Sensor system 15 includes a micromechanical yaw rate sensor 1, which is illustrated only schematically and by way of example, as well as a passive sensor 10 in the form of a micromechanical acceleration sensor 10. Yaw rate sensor 1 includes a substrate 2 and a seismic mass 3, which is movably suspended opposite substrate 2 (frequently also referred to as a Coriolis element or sensor element). Seismic mass 3 is excited with the help of capacitive drive units 4 to a working oscillation 5 which, in the present example, is oriented parallel to a main extension plane 100 of substrate 2. For this purpose, drive units 4 include finger electrode structures 4', which are fixed relative to the substrate and between which counter-electrodes 4" of seismic mass 3, which are designed as finger electrodes, engage. An alternating voltage, which is applied to each side of seismic mass 3, between finger electrode structures 4' and counter-electrodes 4" in each case, generates a driving force on seismic mass 3, due to electrostatic interaction between finger electrode structures 4' and counter-electrodes 4", thereby inducing the working oscillation. If a yaw rate 17 is now present which is oriented perpendicularly to working oscillation 5 and parallel to main extension plane 100, a Coriolis force acts upon seismic mass 3 perpendicularly to main extension plane 100, thereby inducing a Coriolis deflection 6 of seismic mass 3 perpendicularly to main extension plane 100.

Coriolis deflection 6 is a measure of yaw rate 17 to be measured and is capacitively measured with the help of junction electrode elements 14, which are situated, for example, between seismic mass 3 and substrate 2. An output signal 13, which is dependent on Coriolis deflection 6, is transmitted via a data interface 12 to a working processor 11, which is provided for further processing output signal 13. Data interface 12 includes, in particular, a digital interface so that output signals 13 are transmitted to working processor 11 in the form of digital data. If no yaw rate 17 is present, and in particular if no yaw rate 17 is measured over a determined time interval, yaw rate sensor 1 is switched from the described operating mode to a power-saving mode by reducing the frequency and/or amplitude of working oscillation 5 for the purpose of saving power. The power-saving mode includes, in particular, a "sleep mode," in which working oscillation 5 is completely deactivated (the frequency and amplitude are largely equal to zero), or a "low power mode," in which a working oscillation 5 operates at reduced power consumption (the frequency and/or amplitude is/are reduced compared to a normal operating mode). For this purpose, yaw rate sensor 1 has an interrupt interface 7, which is implemented, for example, in the form of an additional connecting pin or the like. Interrupt interface 7 is coupled with a circuit unit 9, which periodically or continuously checks interrupt interface 7 for the presence of an interrupt signal 8.

Circuit unit 9 is furthermore coupled with drive units 4, drive units 4 being controlled by circuit unit 9 in such a way that yaw rate sensor 1 is switched to power-saving mode, i.e., the frequency and/or amplitude of working oscillation 5 is reduced or set to zero when an interrupt signal 8 is detected at interrupt interface 7. Yaw rate sensor 1 may be subsequently maintained in the power saving state as long as interrupt signal 8 is present at interrupt interface 7. If interrupt interface 7 becomes free of interrupt signal 8 at a later point in time, yaw rate sensor 1 is switched back to the operating mode, i.e., drive units 4 are controlled in such a way that working oscillation 5 is reactivated and/or the frequency and/or amplitude of working oscillation 5 is/are reset back to the initial value. Interrupt signal 8 is activated and deactivated by passive sensor 10 (also referred to as the external component), which may include a micromechanical acceleration sensor.

An acceleration value measured by the acceleration sensor in the form of a sensor signal is compared with a sensor threshold value. Interrupt signal 8 is generated if the acceleration value drops below the sensor threshold value (in particular for a determined period of time), since no yaw rate 17 to be measured by yaw rate sensor 1 is present in this case. In the event that the sensor threshold value is exceeded by the acceleration value, interrupt signal 8 is interrupted so that yaw rate sensor 1 is able to carry out a yaw rate measurement. It is conceivable for yaw rate sensor 1 to be designed, in principle, in a manner other than yaw rate sensor 1 illustrated by way of example in FIG. 1. For example, an implementation having a differential yaw rate sensor 1 is conceivable, which includes two seismic masses 3 and/or one multichannel yaw rate sensor 1 which is/are provided perpendicularly to main extension plane 100 and/or perpendicularly to working oscillation 5 for the purpose of measuring an additional yaw rate 17. Furthermore, it is conceivable to implement drive units 4 in the form of plate capacitor drives and the like.

Figure 2B:
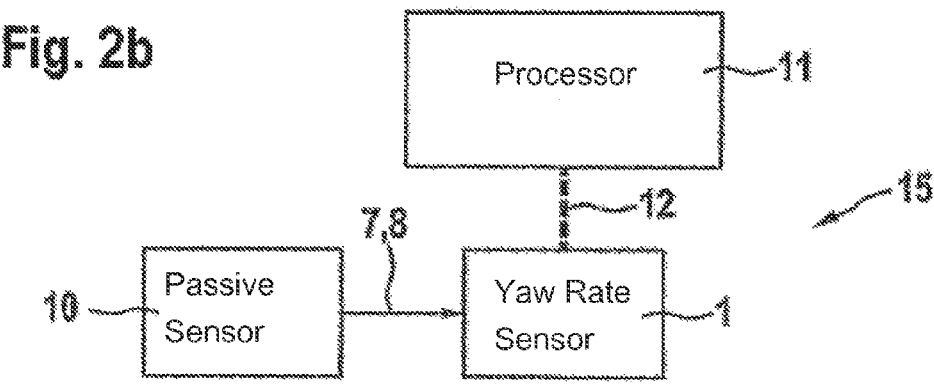
FIG. 2b shows a schematic view of another operating state of a sensor system according to a second specific embodiment of the present invention.

FIGS. 2a and 2b are schematic views of two operating states of a sensor system 15 according to a second specific embodiment of the present invention, the second specific embodiment being largely identical to the first specific embodiment illustrated in FIG. 1. In FIG. 2a, yaw rate sensor 1 is illustrated in the operating mode, in which no interrupt signal 8 is present at interrupt interface 7. In this operating mode, yaw rate sensor 1 continuously performs a yaw rate measurement and transmits output signal 13 to working processor 11, which includes, in particular, a microcontroller, via data interface 12 as a function of measured Coriolis deflection 6.

In FIG. 2b, the sensor signal ascertained by sensor 10 drops below the sensor threshold value, so that an interrupt signal 8 is present at interrupt interface 7. Yaw rate sensor 1 is therefore switched to a power saving state, in which no yaw rate measurement is carried out, by reducing the amplitude and/or the frequency of working oscillation 5. As a result, no output signal 13 is transmitted to working processor 11 via data interface 12. This process is illustrated schematically by the broken line of data interface 12.

What is claimed is:
1. A yaw rate sensor, comprising:
   a substrate;
   a drive unit;
   a seismic mass, which is movable relative to the substrate, the seismic mass being excitable to a working oscillation relative to the substrate by the drive unit, wherein a Coriolis deflection of the seismic mass perpendicular to the working oscillation is detectable; and
an electrical contacting pin conducting an electrical signal that directly produces a reduction in at least one of a frequency and an amplitude of the working oscillation at the drive unit if an interrupt signal is present at the electrical contacting pin without an additional external control unit; and
   a circuit unit which is functionally coupled with the electrical contacting pin and with the drive unit, wherein the circuit unit is configured to detect the interrupt signal, and wherein the circuit unit is configured to control the drive unit as a function of the interrupt signal so that a reduction in at least one of a frequency and an amplitude of the working oscillation is provided upon detecting the interrupt signal.

2. The yaw rate sensor of claim 1, wherein at least one of the following is satisfied: (i) the yaw rate sensor is configured to at least one of activate the working oscillation and increase at least one of a frequency and an amplitude to an initial value if the interrupt signal is not present at the electrical contacting pin, and (ii) the yaw rate sensor has a data interface, the yaw rate sensor being connected to a working processor via the data interface.

3. A sensor system, comprising:
  a yaw rate sensor, including:
    a substrate,
    a drive unit,
    a seismic mass, which is movable relative to the substrate, the seismic mass being excitable to a working oscillation relative to the substrate by the drive unit, wherein a Coriolis deflection of the seismic mass perpendicular to the working oscillation is detectable, and
    an electrical contacting pin conducting an electrical signal that directly produces a reduction in at least one of a frequency and an amplitude of the working oscillation at the drive unit if an interrupt signal is present at the electrical contacting pin without an additional external control unit;
  a sensor; wherein the yaw rate sensor is coupled with the sensor via the electrical contacting pin, and wherein the sensor is configured to output the interrupt signal via the electrical contacting pin as a function of a sensor signal; and
  a circuit unit which is functionally coupled with the electrical contacting pin and with the drive unit, wherein the circuit unit is configured to detect the interrupt signal, and wherein the circuit unit is configured to control the drive unit as a function of the interrupt signal so that a reduction in at least one of a frequency and an amplitude of the working oscillation is provided upon detecting the interrupt signal.

4. The sensor system of claim 3, wherein at least one of the following is satisfied: (i) the sensor is configured to output the interrupt signal via the electrical contacting pin as a function of a comparison between the sensor signal and a sensor threshold value, and (ii) the sensor includes at least one of an acceleration sensor and a proximity sensor.

5. A method for operating a yaw rate sensor, the method comprising:
  exciting a seismic mass to a working oscillation by a drive unit of the yaw rate sensor, the yaw rate sensor including:
    a substrate,
    the drive unit,
    the seismic mass, which is movable relative to the substrate, the seismic mass being excitable to the working oscillation relative to the substrate by the drive unit, wherein a Coriolis deflection of the seismic mass perpendicular to the working oscillation is detectable, and
    an electrical contacting pin conducting an electrical signal that directly produces a reduction in at least one of a frequency and an amplitude of the working oscillation at the drive unit if an interrupt signal is present at the electrical contacting pin without an additional external control unit;
  detecting the Coriolis deflection of the seismic mass perpendicular to the working oscillation; and
  reducing at least one of a frequency and an amplitude of the working oscillation if the interrupt signal is detected at the electrical contacting pin of the yaw rate sensor;
  wherein the electrical contacting pin is monitored for the presence of the interrupt signal via a circuit unit, and the drive unit is controlled via the circuit unit so that at least one of the frequency and the amplitude of the working oscillation is reduced upon detecting the interrupt signal.

6. The method of claim 5, wherein at least one of the following is satisfied: (i) the working oscillation is reactivated; and (ii) at least one of the frequency and the amplitude of the working oscillation is again increased to an initial value when the interrupt signal is no longer detected at the electrical contacting pin.

7. The method of claim 5, wherein if no interrupt signal is detected, an output signal is generated as a function of the Coriolis deflection, and wherein the output signal is transmitted to a working processor via a data interface which is independent of the electrical contacting pin.

8. A method for operating a yaw rate sensor system, the method comprising:
  exciting a seismic mass to a working oscillation by a drive unit of a yaw rate sensor, the yaw rate sensor system including: the yaw rate sensor including:
    a substrate,
    the drive unit,
    the seismic mass, which is movable relative to the substrate, the seismic mass being excitable to the working oscillation relative to the substrate by the drive unit, wherein a Coriolis deflection of the seismic mass perpendicular to the working oscillation is detectable, and
    an electrical contacting pin conducting an electrical signal that directly produces a reduction in at least one of a frequency and an amplitude of the working oscillation at the drive unit if an interrupt signal is present at the electrical contacting pin without an additional external control unit; and
  a sensor, wherein the yaw rate sensor is coupled with the sensor via the electrical contacting pin, and wherein the sensor is configured to output the interrupt signal via the electrical contacting pin as a function of a sensor signal;
  detecting the Coriolis deflection of the seismic mass perpendicular to the working oscillation; and
reducing at least one of the frequency and the amplitude of the working oscillation if the interrupt signal is detected at an the electrical contacting pin of the yaw rate sensor; wherein the interrupt signal is generated by the sensor, wherein the interrupt signal is generated as a function of a comparison between the sensor signal and a sensor threshold value, and wherein the interrupt signal is generated upon failure to reach a determined acceleration value;
  wherein the electrical contacting pin is monitored for the presence of the interrupt signal via a circuit unit, and the drive unit is controlled via the circuit unit so that at least one of the frequency and the amplitude of the working oscillation is reduced upon detecting the interrupt signal, wherein at least one of the frequency and the amplitude of the working oscillation is reduced to the extent that the working oscillation is stopped.

9. The yaw rate sensor of claim 1, wherein at least one of the following is satisfied: (i) the yaw rate sensor is configured to at least one of activate the working oscillation and increase at least one of a frequency and an amplitude to an initial value if an interrupt signal is not present at the electrical contacting pin, and (ii) the yaw rate sensor has a data interface, the yaw rate sensor being connected to a working processor via the data interface, the yaw rate sensor being configured to output an output signal, which is dependent on the Coriolis deflection, to the working processor via the data interface, and the data interface being independent of the electrical contacting pin.

* * * * *